United States Patent Office 3,391,055
Patented July 2, 1968

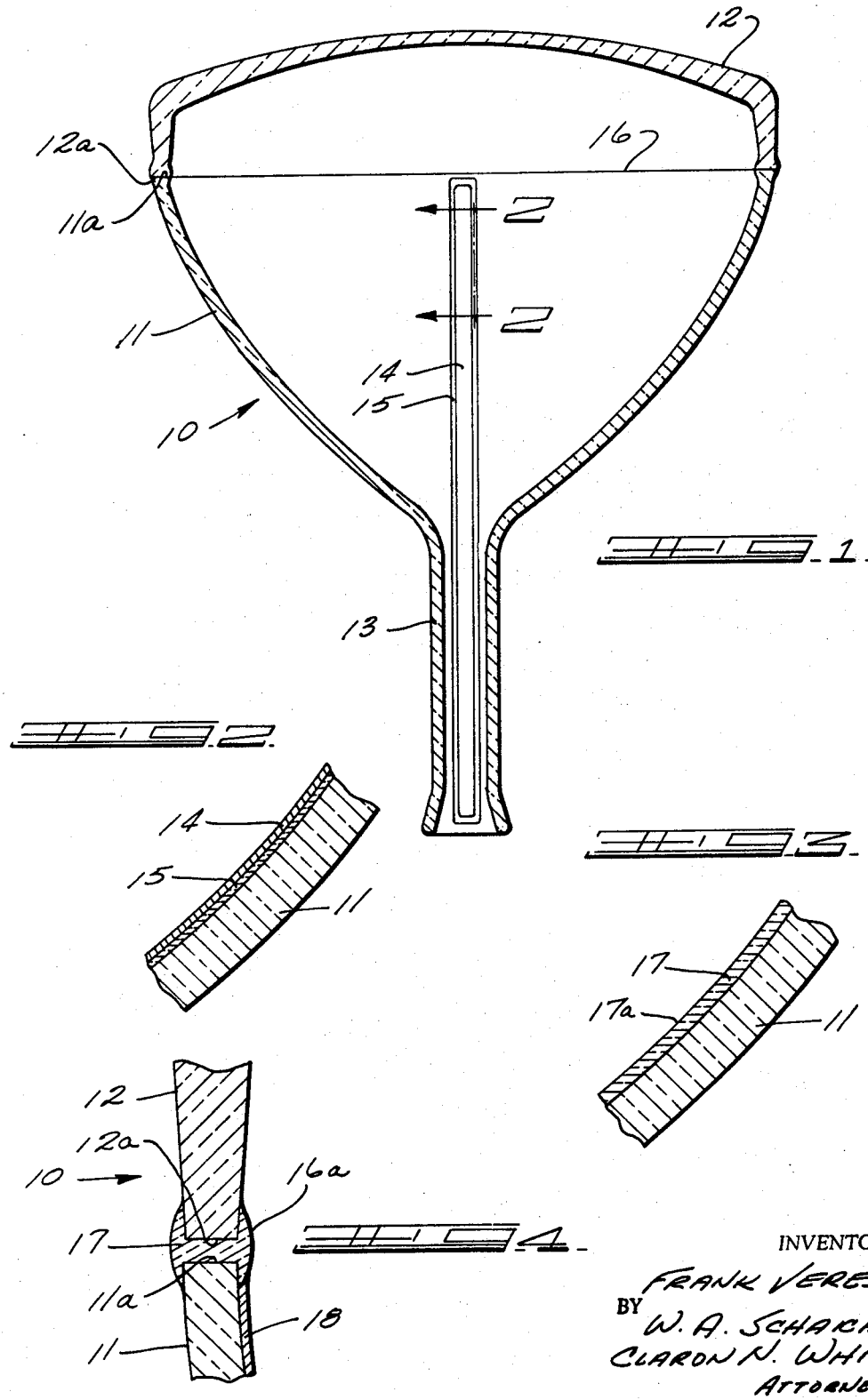

3,391,055
ELECTRICALLY CONDUCTIVE
SOLDER GLASS
Frank Veres, Toledo, Ohio, assignor to Owens-Illinois Inc., a corporation of Ohio
Filed Apr. 27, 1965, Ser. No. 451,204
17 Claims. (Cl. 161—193)

The present invention relates to solder glasses and more specifically to low-melting electrically conductive solder glass compositions and to methods of application which are applicable to durable bonding of such compositions to glass and/or articles having vitreous surfaces. The invention is equally applicable to providing an electrical path on a unitary glass surface, between glass-to-glass surfaces or glass-to-metal surfaces.

Heretofore, precious metal containing paints or lacquers have been adhered to glass surfaces primarily for decorative purposes. Methods which have been previously employed in applying precious metal containing materials to glass have consisted of utilizing a laquer and/or synthetic resin containing composition which contains the desired metal, i.e., gold, silver, platinum, etc., in fine particle form and applying the composition to the surfaces to be coated. The coated article is then fired at an elevated temperature which is sufficient to "fuse" (as used here, this term means adhere or bond) the metal to the glass surface. The lacquer or synthetic components serve as vehicles to effect temporary adherence of the powdered metal to the glass and are usually completely eliminated during the firing operation. Various materials have been incorporated into the metal containing compositions to improve the adhesive power and firing characteristics of the precious metal. However, all of these compositions and methods have required that the coating deposited upon the glass surface be elevated to a temperature approaching the softening point temperature of the glass and generally above its annealing point temperature to fuse the metallic particles permanently thereto.

Furthermore, it has been customary to heat these surfaces before applying the metallic particle containing material since the particles adhere much better to hot rather than cold surfaces. As is known, however, many glass articles are subject to thermal stresses and subsequent chippage or breakage in the course of being fusedly coated and such breakage is primarily caused by the preliminary heating which causes considerable temperature variation between parts of the glass which are provided with the metallic coating and other parts of the same article.

In various applications, such as electron discharge devices having essentially all-glass envelopes, it is frequently necessary to arrange a continuous electrically conductive layer either upon the glass surface or extending through a wall of the envelope in certain locations to attain a durable and highly conductive electrical path. Also, it is necessary that the metallic coating be permanently adherent to the glass and compatible therewith in thermal expansivity so as not to peel or flake therefrom while in surface to interrupt temporarily or to destroy entirely the electrical continuity.

Commercial preparations of liquid gold, silver, platinum, etc., containing these specific metallic particles in finely divided particle form or chemically combined with organic molecules are available for deposition on glass surfaces, but invariably require a firing temperature of at least 1000° F. or higher to effect permanent bonding of the metallic particles to the glass. At lower firing temperatures the metallic coating can easily be rubbed or scratched off the glass surface indicating that its degree of permanence when thus applied is unacceptable for long term use particularly where a durable electrical circuit is desired. In most types of picture tubes for polychromatic television reception, for example, temperatures of the order of 1000° F. or higher are entirely prohibitive for certain tube components which are thermally sensitive and cannot withstand exposure to temperatures of this level without being distorted or destroyed. Also in the case of making certain special types of electronic tubes where a glass part carries a thin electrically conductive film, the part must be sealed to other tube parts without disruption or destruction of the film with the sealant being in electrical connection therewith. One example of such application is in sealing separately fabricated hollow funnel and face plate members of an all-glass cathode-ray picture tube envelope by utilization of a low-melting solder glass. Another example is in the case of sealing a small disc-like sight glass having a conductive film thereover to a body portion of an electron discharge tube by means of a Kovar ring where continuity is desired between the film and the Kovar ring through a low-melting sealant. There are many other applications where it is highly desirable to utilize a low-melting solder glass as a coating or sealant wherein the solder glass exhibits properties of chemical durability and electrical conductance.

Accordingly, it is an object of the present invention to provide a low-melting solder glass which contains an electrically conductive metal in finely divided form adaptable to coating a glass surface at relatively low temperatures and furnish an electrically conductive path.

Another object of this invention is to provide a precious metal containing solder glass which is electrically conductive and which has chemical and physical properties adapted to bonding to higher-melting glass compositions utilized in fabricating electronic devices.

Another object of this invention is to provide a devitrifiable electrically conductive solder glass composition having a melting point temperature below the annealing point temperature of a hard glass adapted to electronic use and which is capable of firmly bonding to such hard glass without creating detrimental effects on or within a glass body or surface to which it is adhered, the composition being utilizable in devitrified condition.

A further object of the present invention is to provide a cathode-ray tube envelope comprised of several separately fabricated glass parts which are joined by an electrically conductibe low-melting solder glass which is chemically durable and comparable to the glass parts in thermal dilation.

A still further object of the present invention is to provide a method of adhering an electrically conductive metal containing coating to a glass surface to bond firmly thereto without the creation of thermal or mechanical stresses in the substrate glass.

A still further object of the present invention is to provide a method of effecting an electrically conductive hermetic seal between large hollow preformed glass parts at minimal temperatures without creating deleterious effects within the preformed glass parts and providing durable electrical continuity therethrough.

The specific nature of this invention, as well as other objects and advantages thereof, will become apparent to those skilled in the art from the following detailed description taken in conjunction with the annexed sheet of drawings on which, by way of preferred example only, are illustrated the preferred embodiments of this invention.

On the accompanying drawings:

FIG. 1 is a vertical sectional view of a cathode-ray picture tube envelope adapted to television reception.

FIG. 2 is an enlarged vertical sectional view taken along the line 2—2 of FIG. 1 illustrating a known form of depositing an electrically conductive film on a tube surface.

FIG. 3 is a view similar to FIG. 2 illustrating an electrically conductive film deposited in accordance with the present invention.

FIG. 4 is an enlarged vertical sectional view of the seal area of major prefabricated parts of the tube envelope shown in FIG. 1.

In a preferred embodiment of the present invention a cathode-ray picture tube 10 as illustrated in FIG. 1 is provided having a glass envelope which is comprised of a frusto-conical shaped funnel 11, a face plate viewing member 12, and a neck tubulation 13 at the termination of which is mounted one or more electron-emitting beam guns (not shown). All of the required working components of the tube are not shown in the drawings as they are unnecessary to constitute a complete teaching of the invention.

On the inner surfaces of tube funnel 11 and neck 13 extending in a lineal direction is located one form of the present invention. An electrically conductive metallic stripe 14 is applied in overlying relationship to an intermediate layer 15 of low-melting solder glass which may be in either vitreous or devitrified condition. Underlying layer 15 of solder glass and overlying metallic strip 14 are applied to the funnel and neck portions of tube 10 subsequent to their fabrication but prior to integrally uniting funnel 11 to face plate 12 along seal line 16. The seal between the major parts of the tube envelope may be effected by direct fusion of the glass or by interposing an annular layer of low-melting sealant as described hereinbelow.

As an example of one method of performing the present invention prescribed surface areas of the tube funnel 11 and neck 13, such as the lineal path shown in FIG. 1 extending from seal line 16 to the termination of tubulation 13, are coated initially with a relatively thin layer 15 of low-melting solder glass composition. This composition has chemical and physical properties compatible with the glass of funnel 11 and neck 13 which may be of similar or slightly dissimilar compositions. The low-melting solder glass may be either vitreous in having properties of a true glass or may be devitrifiable to exist on the glass surface after application in devitrified durable form.

Examples of vitreous forms of the low-melting solder glasses have been fully disclosed in U.S. Patent No. 3,127,278. One such glass solder disclosed therein which has been successfully used in the present invention is composed of 2.08% $SiO_2$; 15.4% $B_2O_3$; 1.88% CuO; 71.17% PbO and 9.47% ZnO, all listed in weight percent. This composition has a fiber softening point temperature of approximately 410° C. and a coefficient of thermal expansion in the range of from $88 \times 10^{-7}$ to $92 \times 10^{-7}$ cm. per cm. per ° C. and usually a slightly less coefficient than that of the glass of the prefabricated parts in a temperature range between 0° C. to 250° C. The vitreous solder glasses defined in the referred to patent cover the following range of proportions by weight: lead oxide (PbO) 67–73%; boric oxide ($B_2O_3$) 11–21%; zinc oxide (ZnO) 0.5–11%; copper oxide (CuO) 0.5–11%; and silicon dioxide ($SiO_2$) 2.0–6%. Compositions residing in this range have fiber softening point temperatures varying from 370° C. to 455° C. and coefficients of thermal expansion of about $90 \times 10^{-7}$ cm. per cm. per ° C., being slightly less than that of the glass parts.

Another form of solder glass which may be utilized in the present invention is known as a "devitrifiable" type which differs in that the compositions have extremely broad devitrification ranges and chemical durability suitable for forming hermetic seals with glass parts. The devitrifiable glass sealing compositions comprised essentially by weight 70–80% PbO; 7–14% ZnO; 7–10% $B_2O_3$; 1–3% $SiO_2$; 0–8% BaO and 0–8% CuO, the sum of PbO, ZnO, $B_2O_3$ and $SiO_2$ being over 90%, the compositions having fiber softening point temperatures in the range of from 300° C. to 400° C. and a thermal expansion coefficient in the range of 0° C. to 350° C. from about $80 \times 10^{-7}$ to $120 \times 10^{-7}$ cm. per cm. per ° C. One form of devitrifiable solder glass in accordance with this invention comprises by weight: 70–80% PbO; 7–14% ZnO; approximately 8.5% $B_2O_3$; approximately 2.0% $SiO_2$; 0–8% BaO; 0–8% CuO; and 2–8% finely divided precious metal, the sum of PbO, ZnO, $B_2O_3$ and $SiO_2$ being over 90%. In final form as sealed to the glass these compositions are in devitrified form and are capable of bonding to the glass without creating deleterious effects therein. The devitrifiable materials crystallize during firing to produce a strong seal with the glass which does not melt again when fired to the same temperature level, but has a much higher melting point on each subsequent firing.

Both the vitreous and devitrifiable solder glass compositions may be used with various types of lead-containing or lead-free type compositions of hard glass, particularly those glasses designated for fabricating cathode-ray or light transmitting tube envelopes or other electronic articles.

As further shown in FIGS. 1 and 2 the longitudinal stripe or layer 15 of low-melting solder glass may be deposited in powder form with a suitable vehicle if necessary on the inner surfaces of funnel 11 and neck 13 as a narrow band having a rather thin cross-section. Layer 15 of solder glass may be fired to the base glass at or near the melting temperature of the solder glass which is preferably of the order of approximately 300° C. to 455° C. Its firm adherence to the more refractory glass parts may be readily accomplished at slightly above its melting point temperature. A firing temperature which does not exceed about 460° C. to melt the solder glass and secure its permanent adherence prevents the occurrence of objectionable thermal stresses in or deformation of the glass which generally requires extensive annealing or reshaping when heated to 540° C. or above.

The glass parts such as those indicated as comprising funnel 11, face plate 12 and neck 13 are composed of high melting glass suitable for electronic use. One base glass to which the above solder glass compositions may be satisfactorily applied is a lead-free glass having the following chemical analysis by weight:

| | |
|---|---:|
| $SiO_2$ | 64.53 |
| $Al_2O_3$ | 4.03 |
| CaO | 1.1 |
| MgO | 1.0 |
| BaO | 10.6 |
| $Na_2O$ | 8.1 |
| $K_2O$ | 10.0 |
| $Sb_2O_3$ | 0.2 |
| $F_2$ | 0.3 |
| Oxygen equivalent | −0.13 |

This particular glass has a fiber softening point temperature of 672° C., an annealing point temperature of 470° C. and a coefficient of thermal expansion of $100 \times 10^{-7}$ to $105 \times 10^{-7}$ cm. per cm. per ° C. Obviously, many other combinations of the low-melting solder glass and the high-melting glass compositions may be utilized.

After the low-melting solder glass is fusedly adhered to the glass part in the form of a lineal stripe 15, another stripe 14 of precious metal solution or suspension of powdered precious metal particles is applied over the less refractory solder glass usually by brushing or flowing. The laminated compositions are then heated to the softening point temperature of the solder glass or a temperature level of about 450° C. or slightly beyond. When cooled the metallic stripe 14 adheres very tenaciously to and actually partially diffuses into solder glass layer 15. As stated, to adhere the metallic particles to the glass part alone with the same degree of tenacity would require heating temperatures of 540° C. or above.

The metallic solution may consist of one of various conductive coating materials such as Du Pont Liquid Bright Gold, Product Nos. 5063 or 4962, or Liquid Silver, Product No. 4760, all of which are only slightly adherent to high-melting hard glass vitreous surfaces when fired at the above temperature of about 450° C. The metallic solution may be applied to the low-melting solder glass while the latter is at ambient temperature or at an elevated temperature such as described for its initial fusion to the base glass. Organic binders which are incorporated into the commercial metallic solutions are eliminated on firing to produce an electrically conductive continuous path of metal of low resistance.

FIG. 2 illustrates the laminated layers of solder glass 15 and overlying metallic layer 14 as initially applied prior to firing. This form of laminating is known where it is desired to have a precious metal decoration appear in relief. A lead-containing flux which matures at about 510° C. is employed as an underbody for the precious metal.

However, in this invention upon elimination of organic binders or solvents contained within the metallic solutions the several layers 14 and 15 adhere to each other to form, in effect, one heterogeneous layer 17 as shown in FIG. 3 but which is electrically conductive primarily at its surface. When a silver-containing solution or paint is employed, the silver ions diffuse into the low-melting solder glass in molten form so that chemical combination of the laminated material results. The noble metal chemically combines with the surfaces of solder glass particles upon its softening to form a unique physical mixture of the two materials which is both thermally and electrically conductive. The newly-formed metal containing stripe 17 which is tenaciously adherent to the funnel member 11 serves to conduct electrical charges which may collect on the inner surfaces of the tube envelope or to convey an electrical potential from one area of the tube to another. Obviously additional stripes or surfaces of greater or lesser magnitude extending in other directions may also be deposited as required. Metallic stripe 17 is sufficiently durable and adherent to the glass to permit soldering a supplementary electrical terminal thereto as may be required in other types of electron tubes.

Various types of solder glass compositions in addition to the examples set forth hereinabove may be employed to bond the precious metal containing materials to the glass. As stated the solder glass may be comprised of either a so-called vitreous or devitrified type although in accordance with my invention, the composition contains primarily lead-borate with lead oxide comprising the largest single constituent. The high-lead content permits at least partial solubility of particles of noble metals in the solder glass and this partial solubility of particles of noble metals in the solder glass and this partial solubility creates the glass-to-metal bond as indicated by single layer 17.

It has been observed that a greater amount of the metal particles remain on the exterior surface 17a of the newly formed layer but that alteration of the composition of the basic solder glass is achieved by the solution of the noble metal therein.

In another method of making an electrically conductive film or layer adhered to one or more glass parts, finely pulverized solder glass is mixed with a quantity of metal suspension such as one of the aforementioned commercial metallic solutions or a prescribed amount of finely pulverized noble metal. The metal is preferably pulverized to a fineness less than that of the solder glass which may have a fineness of 140 U.S. standard mesh or less. The two materials are thoroughly mixed in either dry or wet form. This mixture is then applied to the glass surface where an electrically conductive film or coating is desired such as on the interior surface of funnel 11 as shown in FIG. 3 or at the seal area 16a between the edges of funnel and face plate members 11 and 12 respectively as shown in FIG. 4. The mixture may be disposed on one or both of the sealing edges 11a and 12a and then heated so that the metal particles form a conductive film upon each individual grain of solder glass. The seal in final form comprises an annular band 17 of conductive solder glass sealed in vacuum-tight relation. The sealant 17 may provide electrical contact through the envelope wall with an internal conductive coating or film 18.

It has been found that silver metal can be employed in minor amount in physical mixtures to form electrically conductive solder glasses applicable to adherence to glass surfaces as well as to seal hermetically complemental annular surfaces of hollow glass envelope parts on firing. Normally there is a tendency for the metal atoms when deposited on the glass alone to aggregate or agglomerate and form stable crystals by surface diffusion and collisions of metal atoms. When agglomeration occurs continuity of the films through the body or surface layer is lost and therefore electrically continuity is interrupted. Such agglomerating does not occur with silver metal-solder glass mixtures especially where a high-lead content of the latter exists. It appears that the polarized lead atoms exert a sufficiently strong force on the metal atoms on the surfaces of the glass particles, i.e, the surface of the solder glass grains, to prevent their migration or attraction by cohesion. Hence, aggregation or "balling up" and subsequent loss of continuity is prevented.

In practicing the present invention two factors are of vital importance namely, (1) the solder glass must, at least to some degree, act as a solvent toward the metal in order to form a bond therewith, and (2) the bond between the solder glass and the metal must be sufficiently strong to prevent appreciable migration of the metal atoms deposited on the glass surface. In attainment of factor 1 which is of very great importance, the addition of small amounts of tin oxide and bismuth oxide to the solder glass has been found to be exceedingly beneficial. The selected solder glass may have about 0.1 to 4.0% bismuth oxide ($Bi_2O_3$) or about 0.1 to 2.0% tin oxide ($SnO_2$) incorporated therein as an additional constituent to promote the solubility of the precious metal. As is known in the art of making colored glasses, such as gold ruby and copper ruby, and specifically in promoting solubility of metals in glass, a fraction of 1% of either tin oxide or bismuth oxide is equivalent to approximately a 10% addition of lead oxide. Titanium and antimony oxides are also useful but less potent for this purpose. In attainment of factor 2 it is well known in the art of silvering mirrors and plastics that treatment of the surface with a tin-containing compound results in the formation of the film of tin ions which serve as a bridge between the glass or plastic surface and the silver metal. It has been shown that titanium oxide ($TiO_2$), antimony oxide ($Sb_2O_3$) and ($Sb_2O_5$), barium titanate ($BaTiO_2$) also exert strong forces toward the noble metal ions. These strong forces are due to the large polarizable titanium and antimony atoms. Thus, surface treatment of the ground solder glass by incorporating one of these elements to cause a layer of tin, antimony, titanium, or bismuth oxide to adhere to the surface of each particle assists in obtaining successful results. Thus additions of either tin or antimony oxides to the noble metal-solder glass compositions described above effect a distinct improvement in the manner of practicing the invention. This addition also is helpful in solder glass compositions containing metals other than silver.

Also as an alternative method of practicing the present invention the solder glass-precious metal containing composition may be fabricated into an electrically conductive body or article which might be classified with "Cermet" bodies. Finely ground solder glass having a particle size of generally less than 140 U.S. standard mesh may be mixed with a prescribed quantity of precious metal suspension wherein the precious metal comprises generally less than 10% of the mixture. Generally 2 to 10% and preferably 4 to 6% silver metal has provided good electrical continuity when mixed into both the vitreous and devitrifiable type of solder glasses. An amount of from 2 to 8% metal mixed into the vitreous type solder glass has produced desired results. Their expansion or melting properties are not altered appreciably by this magnitude of silver metal addition. The resultant mixture in dry powder form or wetted with a binder is given a prescribed shape such as by pressing into molded form and then in firing the shaped article in a manner such as by sintering, the article shape is maintained.

Incorporating from 0.5 to 10% by weight of silver into a devitrifiable solder glass having the basic composition by weight of 2.0% $SiO_2$; 12.83% ZnO; 76.22% PbO and 8.95 $B_2O_3$ for example has produced a conductive solder glass which is permanently conductive and which does not create excessive sealing stresses in joining glass-to-glass or glass-to-metal surfaces.

In forming a sealing film or annular layer of the conductive sealing composition, where it is adhered to a glass surface in forming a conductive stripe or a conductive sealing band through the wall of an all-glass cathode-ray tube envelope, the final shape of the material may be precisely controlled if desired to impart specific electrical conductance per unit area to the material.

Thus it may be seen from the foregoing description that metallic particles in powder form or dispersed within prepared suspensions may be physically mixed with finely divided solder glass and the mixture then applied to glass which is considerably more refractory and higher melting than the solder glass. The mixture is then heated to temperatures of about 450° C. and generally below 500° C., preferably a maximum of about 460° C., to secure firm and positive adherence to the base glass. Progressively mixing lesser amounts of the metal into the solder glass results in progressively higher resistance of the coating up to limits where electrical continuity is lost.

The vitreous-type solder glasses referred to above are those which exhibit properties of melting and remelting at essentially the same temperature while opening and resealing of a tube envelope may be necessary. The devitrifiable-type solder glasses are those which crystallize during firing and produce a stronger seal and which do not melt when again fired to the same temperature but exhibit a melting point much higher than the initial melting point prior to devitrification. The term "hard" glass as used herein is intended to refer to common glass compositions which do not soften but maintain their shape at temperatures below about 540° C.

As will be evident to those skilled in the art, various modifications of this invention can be made or followed in the light of the foregoing disclosure and discussion without departing from the spirit and scope of the disclosure or from the scope of the claims.

What is claimed is:

1. A method of forming on a glass surface of an article an electroconductive adherent coating containing a precious metal which comprises contacting a precious metal in finely divided form with a low-melting, low-expansion sealing composition consisting essentially of lead borate while said sealing composition is in contact with said glass surface, heating said metal, composition and glass surface to an elevated temperature, up to a maximum temperature of 480° C., sufficient to soften and fuse said composition to the precious metal and to the glass surface, said sealing composition having a coefficient of thermal dilation about that of the glass surface of said article.

2. The method of claim 1 wherein the sealing composition is a vitreous solder glass consisting essentially by weight of 67% to 73% lead oxide (PbO); 11% to 21% boric oxide ($B_2O_3$); 0.5% to 11% zinc oxide (ZnO); 0.5% to 11% copper oxide (CuO); and 2.0% to 6% silicon dioxide ($SiO_2$), said solder glass having a fiber softening point temperature between 370° C. and 455° C. and a coefficient of thermal expansion in the range of 0° C. to 300° C. of about $90 \times 10^{-7}$ cm. per cm. per ° C.

3. The method of claim 1 wherein the sealing composition is a devitrifiable solder glass consisting essentially by weight of 70% to 80% lead oxide (PbO); 7% to 14% zinc oxide (ZnO); 7% to 10% boric oxide ($B_2O_3$); 1% to 3% silicon dioxide ($SiO_2$); 0% to 8% barium oxide (BaO), and 0% to 8% copper oxide (CuO), the sum of lead oxide, zinc oxide, boric oxide and silicon dioxide being over 90%, said composition having a fiber softening point temperature in the range of 300° C. to 400° C. and a coefficient of thermal expansion in the range of 0° C. to 350° C. of about $90 \times 10^{-7}$ cm. per cm. per ° C.

4. A method of forming an adherent coating of a precious metal on a surface of a glass article which comprises placing a coating of a sealing glass composition consisting essentially of lead borate on the glass surface, heating the glass article and the sealing composition to an elevated temperature, up to a maximum temperature of 480° C., to melt the sealing composition and adhere it to the glass surface, placing a coating of a suspension of powdered precious metal particles on the coating of the sealing composition adhered to the glass surface, heating the glass article, its sealing composition coating and the suspension of precious metal particles to an elevated temperature, up to a maximum temperature of 480° C., to melt the sealing composition for adherence of the metal particles to the coating of said sealing composition, said sealing composition having a coefficient of thermal expansion slightly less than that of the glass article.

5. The method of claim 4 wherein the sealing composition is a vitreous solder glass consisting essentially by weight of 67% to 73% lead oxide (PbO); 11% to 21% boric oxide ($B_2O_3$); 0.5% to 11% zinc oxide (ZnO); 0.5% to 11% copper oxide (CuO); and 2.0% to 6% silicon dioxide ($SiO_2$), said solder glass having a fiber softening point temperature between 370° C. and 455° C. and a coefficient of thermal expansion in the range of 0° C. to 300° C. of about $90 \times 10^{-7}$ cm. per cm. per ° C.

6. The method of claim 5 wherein the glass article is a high-melting glass having the following chemical analysis by weight: 64.53% $SiO_2$; 4.03% $Al_2O_3$; 1.1% CaO; 1% MgO; 10.6% BaO; 8.1% $Na_2O$; 10% $K_2O$; 0.2% $Sb_2O_3$; and 0.3% $F_2$, said hard glass having a fiber softening point temperature of 672° C., an annealing point temperature of 470° C. and a coefficient of thermal expansion of between $100 \times 10^{-7}$ and $105 \times 10^{-7}$ cm. per cm. per ° C., and wherein the sealing composition has the following chemical analysis by weight: 2.08% $SiO_2$; 15.4% $B_2O_3$; 1.88% CuO; 71.17% PbO; and 9.47% ZnO and wherein the precious metal is silver.

7. The method of claim 4 wherein the sealing composition is a devitrifiable solder glass consisting essentially by weight of 70% to 80% lead oxide (PbO); 7% to 14% zinc oxide (ZnO); 7% to 10% boric oxide ($B_2O_3$); 1% to 3% silicon dioxide ($SiO_2$); 0% to 8% barium oxide (BaO); and 0% to 8% copper oxide (CuO), the sum of lead oxide, zinc oxide, boric oxide and silicon dioxide being over 90%, said composition having a fiber softening point temperature in the range of 300° C. to 400° C. and a coefficient of thermal expansion in the range of 0° C. to 350° C. of about $90 \times 10^{-7}$ cm. per cm. per ° C.

8. The method of claim 7 wherein the glass article is a high-melting glass having the following chemical analysis by weight: 64.53% $SiO_2$; 4.03% $Al_2O_3$; 1.1% CaO; 1% MgO; 10.6% BaO; 8.1% $Na_2O$; 10% $K_2O$; 0.2% $Sb_2O_3$; and 0.3% $F_2$, said hard glass having a fiber softening point temperature of 672° C., an annealing point temperature of 470° C. and a coefficient of thermal expansion of between $100 \times 10^{-7}$ and $105 \times 10^{-7}$ cm. per cm. per ° C., and wherein the sealing composition has the following chemical analysis by weight: 2.08% $SiO_2$;

15.4% $B_2O_3$; 1.88% CuO; 71.17% PbO; and 9.47% ZnO and wherein the precious metal is silver.

9. A method of forming an adherent electroconductive coating on a surface of a glass article, which comprises mixing a major amount of finely pulverized sealing composition consisting essentially of lead borate and a minor amount of a precious metal, applying the mixture to a surface of a glass article, and heating the glass article with applied coating of the mixture to an elevated temperature, up to a maximum temperature of 480° C., to soften and fuse the mixture to the surface of the glass article for the formation of an adherent electroconductive coating on the surface, said sealing composition powder having particles sufficiently small to pass through a 140 U.S. standard mesh screen and said particles of the metal having a substantially smaller size than the larger particles of the sealing composition, said sealing composition having a coefficient of thermal expansion slightly less than that of the glass article.

10. The method of claim 9 wherein the maximum temperature of heating is 450° C., the precious metal is silver, and the sealing composition is a vitreous solder glass consisting essentially by weight of 67% to 73% lead oxide (PbO); 11% to 21% boric oxide ($B_2O_3$); 0.5% to 11% zinc oxide (ZnO); 0.5% to 11% copper oxide (CuO); and 2.0% to 6% silicon dioxide ($SiO_2$), said solder glass having a fiber softening point temperature between 370° C. and 455° C. and a coefficient of thermal expansion in the range of 0° C. to 300° C. of about $90 \times 10^{-7}$ cm. per cm. per ° C.

11. The method of claim 10 wherein the glass article is a high-melting glass having the following chemical analysis by weight: 64.53% $SiO_2$; 4.03% $Al_2O_3$; 1.1% CaO; 1% MgO; 10.6% BaO; 8.1% $Na_2O$; 10% $K_2O$; 0.2% $Sb_2O_3$; and 0.3% $F_2$, said hard glass having a fiber softening point temperature of 672° C., an annealing point temperature of 470° C. and a coefficient of thermal expansion of between $100 \times 10^{-7}$ and $105 \times 10^{-7}$ cm. per cm. per ° C., and wherein the sealing composition has the following chemical analysis by weight: 2.08% $SiO_2$; 15.4% $B_2O_3$; 1.88% CuO; 71.17% PbO; and 9.47% ZnO and wherein the precious metal is silver.

12. The method of claim 10 wherein the sealing composition contains a small amount of tin oxide.

13. The method of claim 10 wherein the sealing composition contains a small amount of bismuth oxide.

14. The method of claim 9 wherein the maximum temperature of heating is 450° C., the precious metal is silver, and the sealing composition is a devitrifiable solder glass consisting essentially by weight of 70% to 80% lead oxide (PbO); 7% to 14% zinc oxide (ZnO); 7% to 10% boric oxide ($B_2O_3$); 1% to 3% silicon dioxide ($SiO_2$); 0% to 8% barium oxide (BaO); and 0% to 8% copper oxide (CuO); the sum of lead oxide, zinc oxide, boric oxide and silicon dioxide being over 90%, said composition having a fiber softening point temperature in the range of 300° C. to 400° C. and a coefficient of thermal expansion in the range of 0° C. to 350° C. of about $90 \times 10^{-7}$ cm. per cm. per ° C., and wherein the mixture by weight is 2% to 10% silver and the balance is sealing glass composition.

15. A unitary article comprising two rigid glass elements each having a coefficient of thermal expansion in the range of 0° C. to 300° C. of about $80 \times 10^{-7}$ to $100 \times 10^{-7}$ cm. per cm. per ° C. and having annular edges of essentially matching configuration, and an annular electroconductive layer of low-melting, low-expansion sealing composition between and adherently bonded to said glass elements at said annular edges to form a hermetic seal, said layer consisting essentially by weight of from 2% to 10% precious metal as particles having sizes substantially less than 140 U.S. standard mesh and a low-melting lead borate composition, said lead borate having a coefficient of thermal dilation about that of the glass of said elements.

16. The article of claim 15 wherein the continuous phase of the annular layer consists essentially by weight of 67% to 73% lead oxide; 11% to 21% boric oxide; 0.5% to 11% zinc oxide; 0.5% to 11% copper oxide; and 2.0% to 6% silicon dioxide, and said composition has a fiber softening point temperature between 370° C. and 455° C. and a coefficient of thermal expansion in the range of 0° C. to 300° C. of about $90 \times 10^{-7}$ cm. per cm. per ° C. and wherein the glass of said two elements has a coefficient of thermal expansion greater than that of said continuous phase composition.

17. The article of claim 15 wherein the continuous phase of the annular layer consists essentially by weight of 70% to 80% lead oxide; 7% to 14% zinc oxide; 7% to 10% boric oxide; 1% to 3% silicon dioxide; 0% to 8% barium oxide; and 0% to 8% copper oxide, the sum of lead oxide, zinc oxide, boric oxide and silicon dioxide being over 90%, and said composition has a fiber softening point temperature between 300° C. and 400° C. and a coefficient of thermal expansion in the range of 0° C. to 350° C. of about $90 \times 10^{-7}$ cm. per cm. per ° C. and wherein the glass of said two elements has a coefficient of thermal expansion greater than that of said continuous phase composition.

References Cited

UNITED STATES PATENTS

| | | | |
|---|---|---|---|
| 2,918,757 | 12/1959 | Francel et al. | 161—196 |
| 3,029,559 | 4/1962 | Treptow | 161—196 |

ROBERT F. BURNETT, *Primary Examiner.*

W. J. VANBALEN, *Assistant Examiner.*